US011528270B2

(12) United States Patent
Moreno et al.

(10) Patent No.: US 11,528,270 B2
(45) Date of Patent: *Dec. 13, 2022

(54) NETWORK AUTHORIZATION IN WEB-BASED OR SINGLE SIGN-ON AUTHENTICATION ENVIRONMENTS

(71) Applicant: Cisco Technology, Inc., San Jose, CA (US)

(72) Inventors: Victor Moreno, Carlsbad, CA (US); Sridhar Subramanian, Fremont, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/867,739

(22) Filed: May 6, 2020

(65) Prior Publication Data
US 2020/0267147 A1 Aug. 20, 2020

Related U.S. Application Data

(63) Continuation of application No. 15/384,365, filed on Dec. 20, 2016, now Pat. No. 10,673,850.

(51) Int. Cl.
*H04L 9/40* (2022.01)
*H04L 61/2503* (2022.01)
(Continued)

(52) U.S. Cl.
CPC ...... *H04L 63/0876* (2013.01); *H04L 61/2503* (2013.01); *H04L 63/0815* (2013.01);
(Continued)

(58) Field of Classification Search
CPC ............ H04L 63/0876; H04L 61/2503; H04L 61/6022; H04L 63/0815; H04L 63/20; H04L 67/18; H04L 63/10; G06F 21/41
See application file for complete search history.

(56) References Cited

U.S. PATENT DOCUMENTS 8,528,071 B1  9/2013 Kwan
8,769,626 B2  7/2014 Gundavelli et al.
(Continued)

OTHER PUBLICATIONS

International Search Report and Written Opinion dated Mar. 6, 2018 in corresponding PCT Application No. PCT/US2017/067286, 13 pages.
(Continued)

*Primary Examiner* — Mohammad W Reza
(74) *Attorney, Agent, or Firm* — Meunier Carlin & Curfman LLC

(57) ABSTRACT

Systems and methods for network authorization are described herein. An example method can include receiving a user credential from a host device connected to a network, authenticating the user credential, and in response to authenticating the user credential, determining an authorization policy associated with the host device. The method can also include polling a network overlay control plane of the network to obtain a network location information associated with the host device, identifying at least one network device of the network using the network location information, and transmitting the authorization policy to the at least one network device.

16 Claims, 3 Drawing Sheets

(51) Int. Cl.
*H04L 67/52* (2022.01)
*G06F 21/41* (2013.01)
*H04L 101/622* (2022.01)

(52) U.S. Cl.
CPC .............. *H04L 63/20* (2013.01); *H04L 67/52* (2022.05); *G06F 21/41* (2013.01); *H04L 63/10* (2013.01); *H04L 2101/622* (2022.05)

(56) References Cited

U.S. PATENT DOCUMENTS

| | | | |
|---|---|---|---|
| 9,935,937 B1* | 4/2018 | Potlapally | H04L 63/0823 |
| 10,200,249 B1* | 2/2019 | Featonby | G06F 9/45558 |
| 2003/0159072 A1 | 8/2003 | Bellinger et al. | |
| 2006/0294575 A1* | 12/2006 | Rogers | H04L 63/20 |
| | | | 726/1 |
| 2007/0053306 A1 | 3/2007 | Stevens | |
| 2009/0307753 A1 | 12/2009 | Dupont et al. | |
| 2011/0072487 A1* | 3/2011 | Hadar | H04L 63/20 |
| | | | 709/202 |
| 2012/0173582 A1* | 7/2012 | Stevens | H04L 67/18 |
| | | | 707/782 |
| 2013/0332982 A1 | 12/2013 | Rao et al. | |
| 2016/0315907 A1* | 10/2016 | Nantel | H04L 29/12028 |

OTHER PUBLICATIONS

Costantino, G. et al., "Towards enforcing on-the-fly policies in BYOD environments," 2013 9th International Conference an Information Assurance and Security (IAS), IEEE, Dec. 2013, pp. 61-65.

* cited by examiner

NETWORK AUTHORIZATION IN WEB-BASED OR SINGLE SIGN-ON AUTHENTICATION ENVIRONMENTS

CROSS-REFERENCE TO RELATED APPLICATIONS

This application is a continuation of U.S. patent application Ser. No. 15/384,365, filed on Dec. 20, 2016, and entitled "NETWORK AUTHORIZATION IN WEB-BASED OR SINGLE SIGN-ON AUTHENTICATION ENVIRONMENTS," the disclosure of which is expressly incorporated herein by reference in its entirety.

BACKGROUND

Web-based authentication and single sign-on (SSO) authentication are done over the top of a network without any knowledge of where an authenticating host device may be attached. For example, when a host device (e.g., Host1) is authenticated in a conventional web-based or SSO authentication environment, information about the network location of Host1 is not known by the authentication authority/service. In most cases, the authentication process works as ships passing in the night.

IEEE 802.1x, which is the standard for port-based network access control, attempts to address this problem, but it has proven impractical for wired host deployment. Additionally, web-based authentication has emerged as the desirable mechanism to authenticate any host, and furthermore, SSO environments are web based. In these environments, it is desirable to enforce the authorization policy at the network level. However, there is no correlation between the authentication process and the network or topological location of the authenticating host.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for network authorization in web-based or single sign-on (SSO) authentication environments, it will become evident to those skilled in the art that the implementations are not limited thereto, but are applicable for other environments in which authentication is done independently of the network and network-based authorization is desirable.

Overview

The systems and methods for network authorization in web-based or SSO authentication environments described herein enhances the ability of an authentication authority/service to obtain network location or topological information associated with an authenticating host device. This information can be used to push an authorization policy the appropriate network attachment point where the authorization policy must be enforced. In other words, the authentication policy can be driven to appropriate network locations based on authentication of the host device. The systems and methods described herein also enable network-based authorization enforcement in environments using web-based or SSO authentication without requiring changes to the network or the authentication system. Further, the systems and methods avoid any requirement for in-band interception of the authentication process by using out-of-band location services to facilitate the subsequent authorization task.

Example Embodiments

Figure 1:
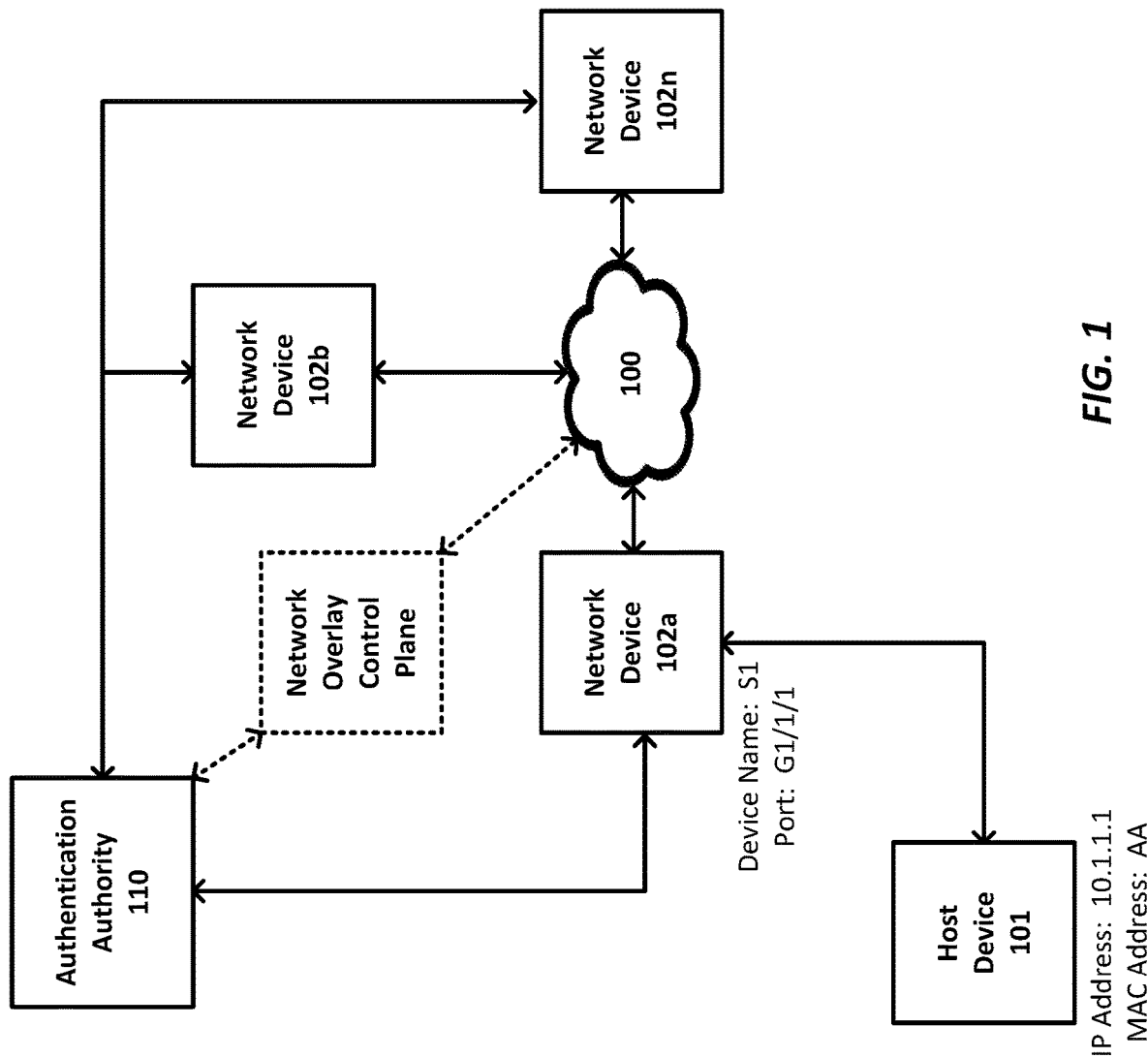
FIG. 1 is a diagram illustrating an example network environment for implementing network authorization as described herein.

Referring now to FIG. 1, an example network environment for providing network authentication as described herein is shown. In FIG. 1, a plurality of network devices 102a, 102b, 102n are provided in a network 100. Each of the network devices 102a, 102b, 102n can optionally be a packet switching device such as a switch or router, a wireless local area network (LAN) controller, or another type of network device. It should be understood that the network 100 can include more or less than three network devices as shown in FIG. 1, which are provided as an example only. The network devices 102a, 102b, 102n can be communicatively coupled to each other through one or more communication links. This disclosure contemplates the communication links can be any suitable communication link. For example, a communication link can be implemented by any medium that facilitates data exchange between the network devices including, but not limited to, wired, wireless and optical links. Example communication links include, but are not limited to, a LAN, a WAN, a MAN, Ethernet, the Internet, or any other wired or wireless link such as WiFi, WiMax, 3G or 4G. In addition, the network 100 can have any network infrastructure known in the art for enabling connectivity and communication between, and management of, the network devices 102a, 102b, 102n. For example, the network 100 can be a virtual LAN (VLAN) or virtual extensible LAN (VXLAN). It should be understood that VLAN and VXLAN are provided only as example network infrastructures and that the network 100 can have other network infrastructures including, but not limited to, fabric path and multiprotocol label switching (MPLS) networks.

As shown in FIG. 1, a host device 101 can attach to the network 100 via one of the network devices, i.e., network device 102a in FIG. 1. In particular, the host device 101 with IP Address 10.1.1.1 and MAC Address AA is connected to Port G1/1/1 of the network device 102a. It should be understood that the host device 101 can connect to other ports of the network device 102a. The host device 101 can optionally be a smart phone, a laptop computer, a tablet computer, a desktop computer, or other type of computing device. The host device 101 can be communicatively coupled to the network 100 through one or more communication links. For example, a communication link can be implemented by any medium that facilitates data exchange including, but not limited to, wired, wireless and optical links. Example communication links include, but are not limited to, a LAN, a WAN, a MAN, Ethernet, the Internet, or any other wired or wireless link such as WiFi, WiMax, 3G or 4G.

The host device 101 can be authenticated before the host device 101 is granted access to the network 100. The host device 101 can be authenticated according to the implementations for network authorization described in detail below. For example, an authentication authority 110 can be configured to perform authentication of the host device 101. The authentication authority 110 can optionally be a server. The authentication authority 110 can be communicatively coupled to the network 100 through one or more communication links. For example, a communication link can be implemented by any medium that facilitates data exchange including, but not limited to, wired, wireless and optical links. Example communication links include, but are not limited to, a LAN, a WAN, a MAN, Ethernet, the Internet, or any other wired or wireless link such as WiFi, WiMax, 3G or 4G. As described herein, the authentication authority 110 can be configured to validate the identity of the host device 101 and can notify the network device 102a as to whether the host device 101 is authorized to access the network 100. The network device 102a can control the ability of the host device 101 to access the network 100 based on the outcome of authentication, which is performed by the authentication authority 110. It should be understood that the network device 102a acts as a proxy between the host device 101 and the authentication authority 110. In other words, the authentication authority 110 is transparent to the host device 101.

Figure 2:
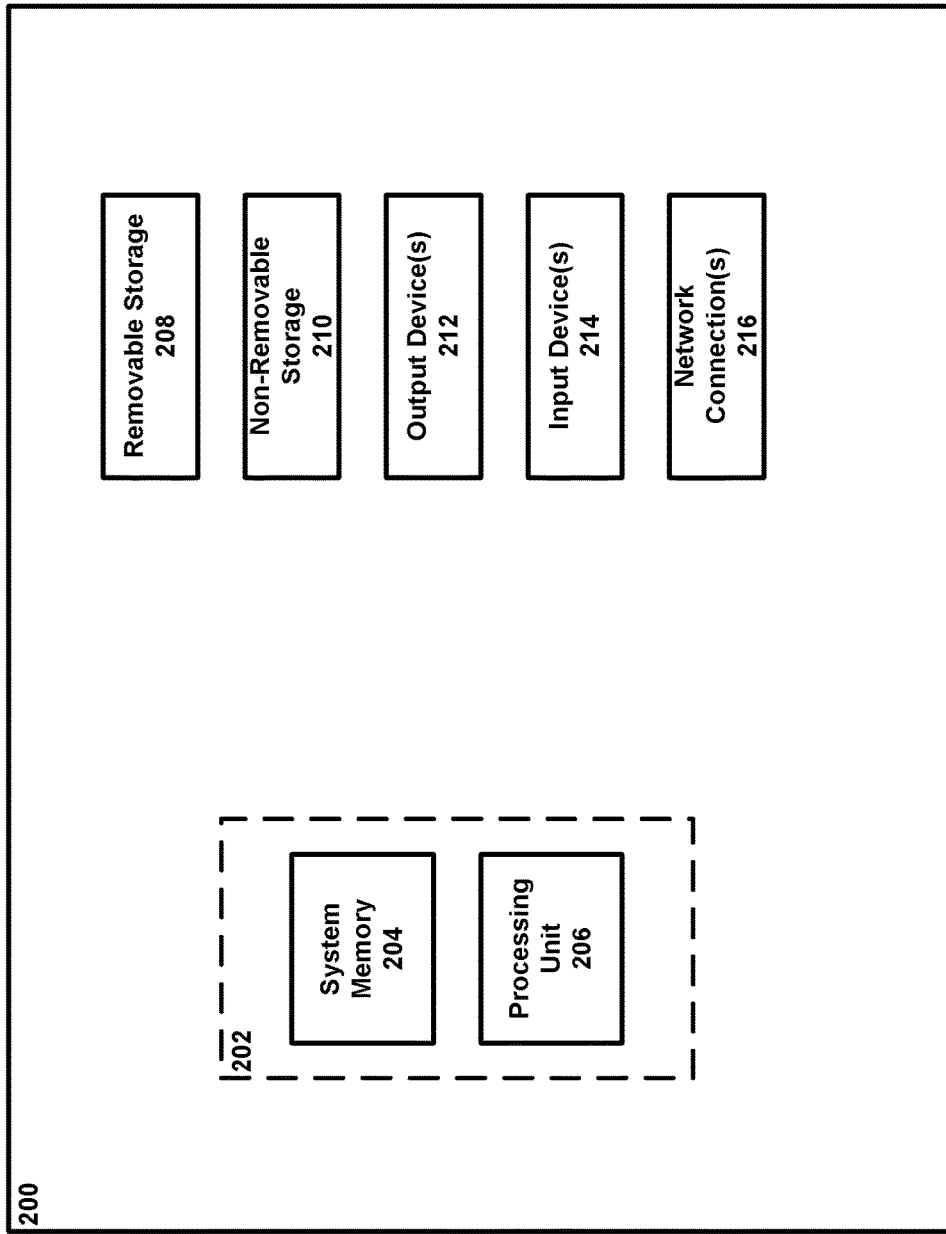
FIG. 2 is a diagram of an example computing device.

Referring to FIG. 2, an example computing device 200 upon which embodiments of the invention may be implemented is illustrated. This disclosure contemplates that the network devices 102a, 102b, 102n, the host device 101, and/or the authentication authority 110 of FIG. 1 can include a computing device such as computing device 200 of FIG. 2. It should be understood that the example computing device 200 is only one example of a suitable computing environment upon which embodiments of the invention may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

It should be appreciated that the logical operations described herein with respect to the various figures may be implemented (1) as a sequence of computer implemented acts or program modules (i.e., software) running on a computing device (e.g., the computing device described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
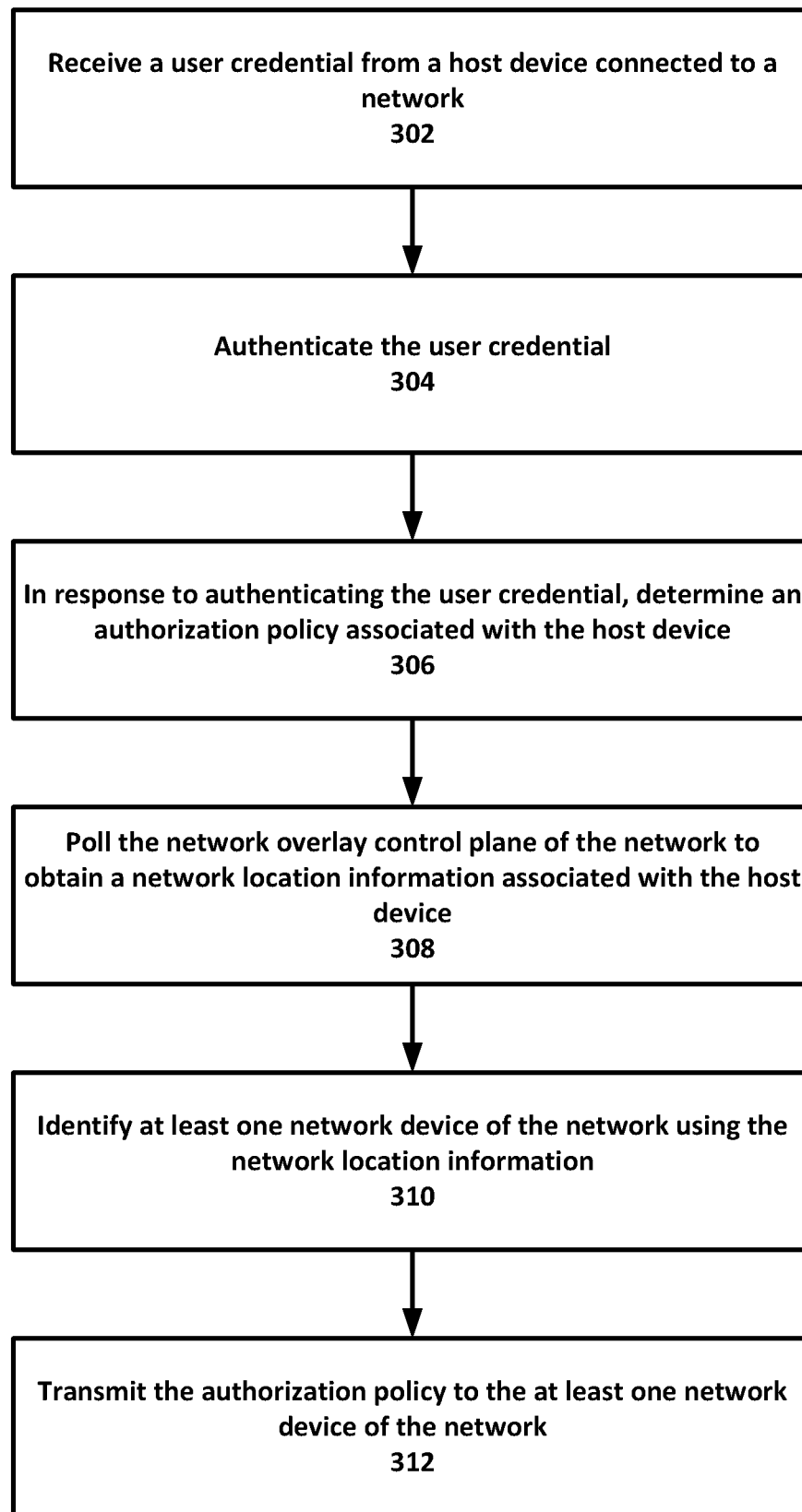
FIG. 3 is a flow chart illustrating example operations for network authorization according to implementations described herein.

Referring now to FIG. 3, a flow chart illustrating example operations for network authorization is shown. Both web-based authentication and SSO authentication presume that a host device (e.g., host device 101 of FIG. 1) authenticating with a network (e.g., network 100 of FIG. 1) has a level of network connectivity. Modern networks can use a network overlay (also referred to herein as a "network overlay control plane" which is shown in FIG. 1) to provide network connectivity for a host device. Example network overlays include, but are not limited to, overlay transport virtualization (OTV) and dynamic multipoint virtual private network (DMVPN) network overlays. Network overlays are known in the art and are therefore not described in further detail herein. Network authorization according to implementations described herein enhance the ability of an authentication authority (e.g., authentication authority 110 of FIG. 1) to obtain network location or topological information associated with the host device from the network overlay control plane and use this information to push an authorization policy the appropriate network attachment point where the authorization policy must be enforced. The authentication authority is sometimes referred to herein as an authentication authority system.

As described above, the host device can attach to the network. For example, the host device can come on-line in the network by connecting to a network device of the network (e.g., one of network devices 102a, 102b, 102n of FIG. 1). The host device can then be assigned to an unauthenticated network segment and can obtain an IP address. The network device to which the host device attaches can be referred to as the host device's locator, network virtualization edge (NVE), or VXLAN tunnel endpoint (VTEP) in a VXLAN environment. It should be understood that the network overlay control plane can access network location or topological information associated with the host device's locator, NVE, or VTEP. In some implementations, the network device to which the host device attaches can be identified by its IP address. In other implementations, the network device can be identified by its IP address, media access control (MAC) address, device identifier, and/or device name, or combinations thereof depending on the network overlay implementation. For an authenticating host device to obtain initial network connectivity, the host device can register its IP address and/or MAC address with the network overlay control plane. This registration creates a binding between the IP address and/or MAC address of the host device and network identification information associated with the network device to which the host device attaches. With reference to FIG. 1, the host device (e.g., host device 101 with IP Address 10.1.1.1 and MAC Address AA) is connected to a port of the network device (e.g., Port G1/1/1 of network device 102a). The network overlay control plane can store this binding in a table as shown below, for example.

| IP/MAC Address | Connected To/Port |
|---|---|
| 10.1.1.1 | S1, G1/1/1 |
| AA | S1, G1/1/1 |

Referring now to FIG. 3, the authentication authority can receive a user credential from the host device at 302. As described above, the host device can communicate with the authentication authority, for example, through the network device to which the host device is attached (i.e., a proxy). The user credential can include a user name and/or a password. This disclosure contemplates that the user credential can optionally include information other than or in addition to a user name and/or password including, but not limited to, a web user interface credential, a personal identification number, a security question/answer, and/or other user information such as birth date, social security number, phone number, etc. In a web-based authentication implementation, the user credential can be entered by a user via the host device and transmitted to the authentication authority. In an SSO authentication implementation, the user credential can be transmitted to the authentication authority by an SSO system. SSO systems are known in the art and are therefore not described in further detail herein. At 304, the authentication authority can authenticate the user credential. For example, the authentication authority can be configured to validate the user credential by comparing it to information stored by or accessible to the authentication authority (e.g., stored in an authentication database). If the user credential received by the authentication authority matches the stored information, then the host device can be authenticated. On the other hand, if the user credential received by the authentication authority does not match the stored information, then the host device cannot be authenticated. This disclosure contemplates using any authentication scheme known in the art to authenticate the host device. At 306, in response to authenticating the user credential, the authentication authority can determine an authorization policy associated with the host device. The authorization policy can include at least one of a VLAN assignment, a virtual routing and forwarding (VRF) assignment, a security group tag (SGT) assignment, an access control list (ACL), or a quality of service (QoS) policy. It should be understood that the authorization policy can include any other network construct or configuration relevant to a user group. This disclosure contemplates that the authorization policies can be stored by or accessible to the authentication authority (e.g., stored in a policy database). In other words, the authentication authority can be configured to obtain (e.g., by look up or request) the appropriate authorization policy associated with the host device after authenticating the host device.

At 308, the authentication authority can poll the network overlay control plane of the network to obtain a network location information associated with the host device. For example, this disclosure contemplates that the authentication authority can poll a database running on a network device (e.g., network device 102a, 102b, or 102n of FIG. 1), a dedicated server, and/or a dedicated router to obtain the network location information. The network location information can be a binding between the host device and the network device to which the host device is attached (e.g., the host device's locator, NVE, or VTEP). For example, the network location information include at least one of an IP address of the host device, a MAC address of the host device, an IP address of the network device, a MAC address of the network device, a port of the network device to which the host device is attached, an identifier of the network device, a name of the network device, or combinations thereof. As described above, this information can be stored by the network overlay control plane in a table, for example. This is contrary to conventional web-based or SSO authentication processes, where the authentication authority lacks information regarding the network location or topology of the authenticating host device.

In some implementations, the authentication authority can poll the network overlay control plane of the network using an application program interface (API) to access a network mapping system. A RESTful API is an example API that can be used with the implementations described herein. REST (Representation State Transfer) is a network architectural style that can be used by web browsers, for example. REST is known in the art and is therefore not described in further detail herein. It should be understood that a RESTful API is provided only as an example and that other APIs may be used to access the network mapping system. An example network mapping system is a Locator/ID Separation Protocol (LISP) mapping system. LISP is a network architecture and set of protocols that is known in the art and is therefore not described in further detail herein. It should be understood that LISP is provided only as an example network architecture and that other network architectures may be used.

In other implementations, the authentication authority can poll the network overlay control plane of the network using a messaging protocol to query the network mapping system. As described above, the network mapping system can be a LISP mapping system. In this example, the authentication authority can use LISP messaging (e.g., map-requests) to query the LISP mapping system. It should be understood that LISP is provided only as an example network architecture and that other network architectures and/or messaging protocols may be used. In yet other implementations, the authentication authority can poll the network overlay control plane of the network by triggering a response by the network mapping system through data plane events. In still other implementations, the authentication authority can poll the network overlay control plane of the network by exchanging routing and reachability with the network overlay control plane. For example, the authentication authority can exchange routing and reachability information using Border Gateway Protocol (BGP). BGP is a known protocol for exchanging routing and reachability information among network nodes on the Internet and is therefore not described in further detail herein. It should be understood that BGP is provided only as an example and that other protocols may be used to exchange routing and reachability information.

At 310, the authentication authority can identify at least one network device of the network using the network location information. For example, the authentication authority can leverage the network location information obtained in Step 308 to identify one or more network devices of the network to which the authorization policy should be sent. Based on the network location information (e.g., the point of network attachment), the authentication authority can determine the appropriate network attachment point(s) where the authorization policy must be enforced. At 312, the authentication authority can transmit the authorization policy to the at least one network device of the network. In some implementations, the authentication authority transmits the authorization policy to the network device to which the host device is attached (e.g., network device 102a in FIG. 1). In other implementations, the authentication authority transmits the authorization policy to a plurality of network devices of the network (e.g., the network device to which the host device is attached, as well as other network devices of the network). This disclosure contemplates that the authentication authority can exchange this information with a network device using any protocol known in the art capable of carrying the authorization policy including, but not limited to, remote authentication dial-in service (RADIUS), terminal access controller access control system (TACACS), REST APIs, or OpFlex.

Upon receipt of the authorization policy, the network device(s) can make configuration changes in accordance with the authorization policy. For example, the network device can configure the port to which the host device is attached (e.g., Port G/1/1/1 of network device 102a of FIG. 1) to reflect the authorization policy. This configuration can be in the form of assignment of VLAN, VRF and SGTs to the port, as well as the configuration of ACLs and QoS policies.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A method for network authorization, comprising:
 receiving, at a computing device, a user credential from a host device connected to a network;
 authenticating, using the computing device, the user credential;

in response to authenticating the user credential, determining, using the computing device, an authorization policy associated with the host device;

polling, using the computing device, a network overlay control plane of the network to obtain a network location information associated with the host device, wherein the network overlay control plane is configured to maintain a network mapping system for the network, and wherein the network location information comprises a network attachment device to which the host device attaches to the network;

identifying, using the computing device and the network location information, a plurality of network devices of the network to enforce the authorization policy, and wherein one of the plurality of network devices is the network attachment device; and transmitting from the computing device the authorization policy to the plurality of network devices, wherein the computing device is configured to perform authentication of host devices in a web-based or single sign-on environment.

2. The method of claim 1, wherein the network location information comprises a binding between the host device and the network attachment device.

3. The method of claim 2, wherein the network attachment device is a locator for the host device, a network virtualization edge (NVE), or a VXLAN tunnel endpoint (VTEP).

4. The method of claim 1, wherein the network location information comprises at least one of an IP address of the host device, a media access control (MAC) address of the host device, an IP address of the network attachment device, a MAC address of the network attachment device, a port of the network attachment device to which the host device is attached, an identifier of the network attachment device, or a name of the network attachment device.

5. The method of claim 1, wherein polling the network overlay control plane of the network further comprises at least one of using an application program interface (API) to access the network mapping system, using a messaging protocol to query the network mapping system, or triggering a response by the network mapping system through data plane events.

6. The method of claim 1, wherein polling the network overlay control plane of the network further comprises exchanging routing and reachability with the network overlay control plane.

7. The method of claim 1, wherein the authorization policy comprises at least one of a virtual local area network (VLAN) assignment, a virtual routing and forwarding (VRF) assignment, a security group tag (SGT) assignment, an access control list (ACL), or a quality of service (QoS) policy.

8. The method of claim 1, wherein the user credential is entered by a user at the host device or submitted by a single sign-on (SSO) system.

9. An authentication authority system, comprising:

a processor and a memory operably coupled to the processor, the memory having computer-executable instructions stored thereon that, when executed by the processor, cause the processor to:

receive a user credential from a host device connected to a network;

authenticate the user credential;

in response to authenticating the user credential, determine an authorization policy associated with the host device;

poll a network overlay control plane of the network to obtain a network location information associated with the host device, wherein the network overlay control plane is configured to maintain a network mapping system for the network, and wherein the network location information comprises a network attachment device to which the host device attaches to the network;

identify, using the network location information, a plurality of network devices of the network to enforce the authorization policy, and wherein one of the plurality of network devices is the network attachment device; and transmit the authorization policy to the plurality of network devices, wherein the authentication authority system is configured to perform authentication of host devices in a web-based or single sign-on environment.

10. The authentication authority system of claim 9, wherein the network location information comprises a binding between the host device and the network attachment device.

11. The authentication authority system of claim 10, wherein the network attachment device is a locator for the host device, a network virtualization edge (NVE), or a VXLAN tunnel endpoint (VTEP).

12. The authentication authority system of claim 9, wherein the network location information comprises at least one of an IP address of the host device, a media access control (MAC) address of the host device, an IP address of the network attachment device, a MAC address of the network attachment device, a port of the network attachment device to which the host device is attached, an identifier of the network attachment device, or a name of the network attachment device.

13. The authentication authority system of claim 9, wherein polling the network overlay control plane of the network further comprises at least one of using an application program interface (API) to access the network mapping system, using a messaging protocol to query the network mapping system, or triggering a response by the network mapping system through data plane events.

14. The authentication authority system of claim 9, wherein polling the network overlay control plane of the network further comprises exchanging routing and reachability with the network overlay control plane.

15. The authentication authority system of claim 9, wherein the authorization policy comprises at least one of a virtual local area network (VLAN) assignment, a virtual routing and forwarding (VRF) assignment, a security group tag (SGT) assignment, an access control list (ACL), or a quality of service (QoS) policy.

16. The authentication authority system of claim 9, wherein the user credential is entered by a user at the host device or submitted by a single sign-on (SSO) system.

* * * * *